No. 608,254. Patented Aug. 2, 1898.
R. EISENMANN.
SATCHEL HANDLE.
(Application filed July 29, 1897.)
(No Model.)
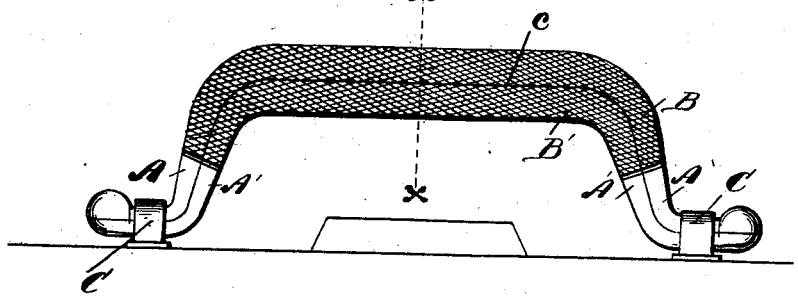
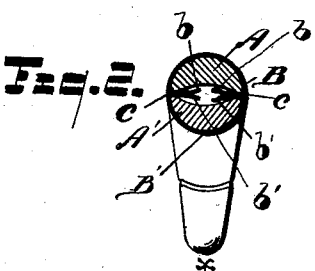
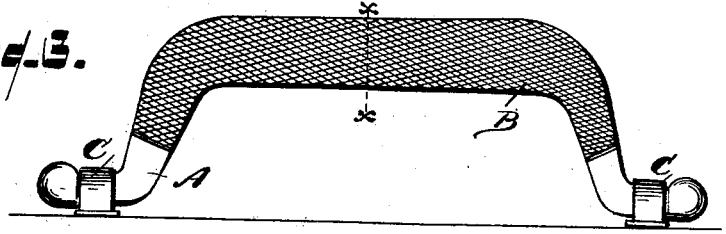
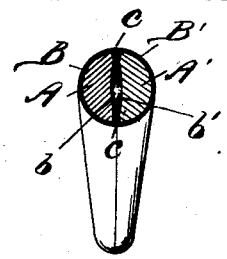
WITNESSES
INVENTOR
Richard Eisenmann
By Fisk & Thomas
attys

UNITED STATES PATENT OFFICE.

RICHARD EISENMANN, OF DETROIT, MICHIGAN.

SATCHEL-HANDLE.

SPECIFICATION forming part of Letters Patent No. 608,254, dated August 2, 1898.

Application filed July 29, 1897. Serial No. 646,315. (No model.)

*To all whom it may concern:*

Be it known that I, RICHARD EISENMANN, a citizen of the United States, residing at Detroit, county of Wayne, State of Michigan, have invented a certain new and useful Improvement in Satchel-Handles; and I declare the following to be a full, clear, and exact description of the invention, such as will enable others skilled in the art to which it pertains to make and use the same, reference being had to the accompanying drawings, which form a part of this specification.

My invention relates to an improvement in handles for satchels, grips, valises, trunks, shawl-straps, &c., the same being shown by the accompanying drawings and more particularly pointed out in the following specification and claims.

In the drawings, Figure 1 is a side elevation of a handle. Fig. 2 is a cross-section of the same on line X X of Fig. 1. Fig. 3 is a variation, and Fig. 4 is a cross-section of the latter on line X X of Fig. 3.

My invention consists in forming the body of the handle in two parts A and A' and covering the separate parts with suitable material B and B'. The edges $b$ and $b'$ are then turned in, so as to lie between the two parts A and A', when the latter are brought together and glued, riveted, or otherwise secured together. A covered handle is thus formed without sewing and practically no seams can be detected. The covering B and B' may inclose the entire body of the handle, or, as shown in the drawings, extend to or adjacent to the clips C, securing the handle to the frame of the grip. Wood, metal, or other suitable material may be employed to form the two parts composing the body of the handle, and the handle-body may be divided as shown in Figs. 1 and 2 or as shown by Figs. 3 and 4, either method being equally efficient.

It will be seen that handles made in accordance with my improved construction can be finished after the two parts A and A' are brought together and secured, so that the dividing-line $c$ cannot be readily detected, and thus a much more highly finished and attractive handle may be made than is possible where the handle is constructed of leather and sewed, exposing a seam on both sides, as in the ordinary form. Another advantage over the ordinary form of handle is secured by my construction in that a rigid shape is presented, while the finish may correspond with that of the body of the valise. It is well known that when the ordinary leather handle has been in use for a short period it loses its shape and rigidity, forcing the fingers of the hand carrying the grip together and causing great inconvenience.

To secure the handle to the frame of the grip, I employ clips C, entering a longitudinal slot in the frame. This form of clip permits the handle to lie flat upon the wall of the grip when not in use, allowing other articles to be placed upon the valise without interfering with the handle.

I am aware that a clip has been used to connect the handle with the frame, and generally through an intermediate ring; but I am not aware that a clip has ever been used that enters the frame through a longitudinal slot and which permits the handle to lie flat, as shown herein. The advantage of the connection through the longitudinal slot is that it does not weaken the frame.

I am also aware that composite handles have been made, but such have been flexible and required the leather to be sewed on, as the bending of the handle will break the glue or pull the edges from the fastening when held as shown herein.

What I claim is—

1. In a satchel-handle the combination of the body formed of the two parts A and A' and the covering material B and B' having the edges $b$ $b'$ turned in to lie between the parts A and A' with means whereby the parts are held together substantially as described.

2. In a valise-handle, the combination of the body consisting of the parts A and A' and the leather covering surrounding the body with its four edges brought together and secured on the lines of juncture of the body parts and flush with the general surface of the body with means whereby the parts are held together substantially as described.

3. In a satchel-handle, the combination of a body formed of two parts, and a covering having edges turned in to lie between the body parts with means whereby the parts are held together, substantially as described.

In testimony whereof I sign this specification in the presence of two witnesses.

RICHARD EISENMANN.

Witnesses:
S. E. THOMAS,
NELLIE JOYCE.